US007686461B2

(12) United States Patent
Goray et al.

(10) Patent No.: US 7,686,461 B2
(45) Date of Patent: Mar. 30, 2010

(54) INTEGRAL BALLAST-IGNITER-LAMP UNIT FOR A HIGH INTENSITY DISCHARGE LAMP

(75) Inventors: Kunal Ravindra Goray, Bangalore (IN); Amit Mukesh Shah, Mumbai (IN)

(73) Assignee: General Electric Company, Niskayuna, NY (US)

( * ) Notice: Subject to any disclaimer, the term of this patent is extended or adjusted under 35 U.S.C. 154(b) by 343 days.

(21) Appl. No.: 11/761,487

(22) Filed: Jun. 12, 2007

(65) Prior Publication Data

US 2008/0309240 A1 Dec. 18, 2008

(51) Int. Cl.
*G02B 5/126* (2006.01)

(52) U.S. Cl. .................... 359/534; 362/373; 315/111.01

(58) Field of Classification Search ................. 359/534; 315/111.01, 117; 362/296.01, 310, 373
See application file for complete search history.

(56) References Cited

U.S. PATENT DOCUMENTS 3,982,154 A 9/1976 Mize et al.
4,490,649 A 12/1984 Wang
5,047,692 A 9/1991 Borowiec et al.
5,047,893 A 9/1991 Farrall et al.
5,150,015 A 9/1992 Heindl et al.
5,214,357 A 5/1993 Dakin et al.
5,691,598 A 11/1997 Belle et al.
6,342,766 B1 1/2002 Cook et al.
6,411,524 B1 6/2002 Chen et al.
6,445,131 B1 9/2002 Wursching et al.
6,462,476 B1 10/2002 Hirschmann et al.
6,570,332 B1 5/2003 Fulop et al.
6,710,545 B2 3/2004 Yamaguchi et al.
6,846,094 B2 1/2005 Luk
7,053,553 B1 5/2006 Fulop et al.
7,102,298 B2 9/2006 Nerone et al.
2002/0144397 A1 10/2002 Morris
2004/0120148 A1* 6/2004 Morris et al. ............... 362/373

FOREIGN PATENT DOCUMENTS

EP 1052447 A2 11/2000

* cited by examiner

*Primary Examiner*—Euncha P Cherry
(74) *Attorney, Agent, or Firm*—Mary Louise Gioeni

(57) ABSTRACT

A high-intensity discharge lamp bulb with an attached housing for ballast and ignition electronics, forming an integral bulb and electronics unit. The electronics housing forms a removable closure for an access opening in a lamp enclosure. The electronics housing isolates the electronics from heat inside the lamp enclosure. A heat sink and radiator on the back of the housing provides heat transfer to a surrounding environment behind the lamp enclosure to cool the electronics. The electronics may be sealed in the housing for protection against entry of foreign substances. The electronics housing is fixed to the access opening of the lamp enclosure and to a boss or reflector mounted in the lamp enclosure, thus providing stable two-point fixation for the unit, reducing vibration.

19 Claims, 5 Drawing Sheets

INTEGRAL BALLAST-IGNITER-LAMP UNIT FOR A HIGH INTENSITY DISCHARGE LAMP

BACKGROUND

The present invention relates to ballast and ignition electronics for high intensity discharge lamps, particularly in automotive headlamps.

High intensity discharge (HID) lamps generate light via an electric arc between electrodes in a sealed transparent tube filled with a gas and containing elements that determine the light spectrum. To start the arc, the gas must be ionized. This can be done by a high voltage initial pulse between the electrodes provided by ignition electronics. Once the gas is ionized, and the other elements are heated and ionized, an electrically conductive plasma exists in the tube, reducing the gap impedance. The voltage is then controlled by ballast electronics to maintain the arc for maximum lamp efficiency and life. The arc and electronics produce heat that can accumulate in a lamp enclosure and damage parts in the enclosure, including the lamp electronics and the enclosure itself. This is especially problematic in automotive headlamps, since they must be sealed in an enclosure for protection from contaminants in the slipstream air. It has been difficult to provide an HID headlamp and electronics as a single unit due to this enclosed heat accumulation. Conventionally, the lamp electronics are kept outside the enclosure to avoid damage from heat inside the enclosure, and to avoid contributing to such heat.

Compact fluorescent bulbs contain ignition and ballast electronics in their base. Although fluorescent lamps use an electric arc, they are not considered HID lamps. Their lower intensity does not produce high heat, so they do not encounter this degree of heat problem.

U.S. Pat. No. 6,710,545 (Yamaguchi et al.) shows an arc discharge lamp 30 with a directly coupled electronic controller 40. However, this system is enclosed in a casing 11 with no external radiator for the electronics, allowing heat to build-up in the casing 11. Also, the lamp/controller unit is mounted with only one point 20*a* of support, and does not contact the casing 11. This allows the lamp to vibrate. Vibration in HID automotive headlamps is a problem. It can damage the lamp or loosen its connections. It can also cause loss of alignment and/or an apparent flicker, which are dangerous distractions to oncoming drivers.

BRIEF DESCRIPTION OF THE INVENTION

An aspect of the invention resides in combining an HID bulb for automotive headlamps with a housing containing ballast and ignition electronics, forming an integral bulb and electronics unit. Another aspect of the invention resides in the electronics housing forming a closure for an access opening in an HID lamp enclosure. Another aspect of the invention resides in the electronics housing insulating the electronics from the interior heat of the lamp enclosure. Another aspect of the invention resides in a heat sink and radiator on a back portion of the electronics housing that cools the electronics by enabling heat transfer from the headlamp enclosure to a surrounding environment. The heat transfer modality may be convective, conductive, or via thermal radiation. This allows the electronics to be sealed in the housing for protection against entry of foreign substances without overheating. Another aspect of the invention resides in affixing the electronics housing at two areas, firstly to the access opening of the lamp enclosure, and secondly to a boss or reflector mounted in the lamp enclosure. This provides stable two-point fixation for the unit, reducing vibration. This combination of features provides a compact, vibration-free HID lamp unit having both sealing against entry of foreign substances and cooling of the electronics, e.g., below a maximum allowable junction temperature of the electronics, making it especially useful for automotive headlamps.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
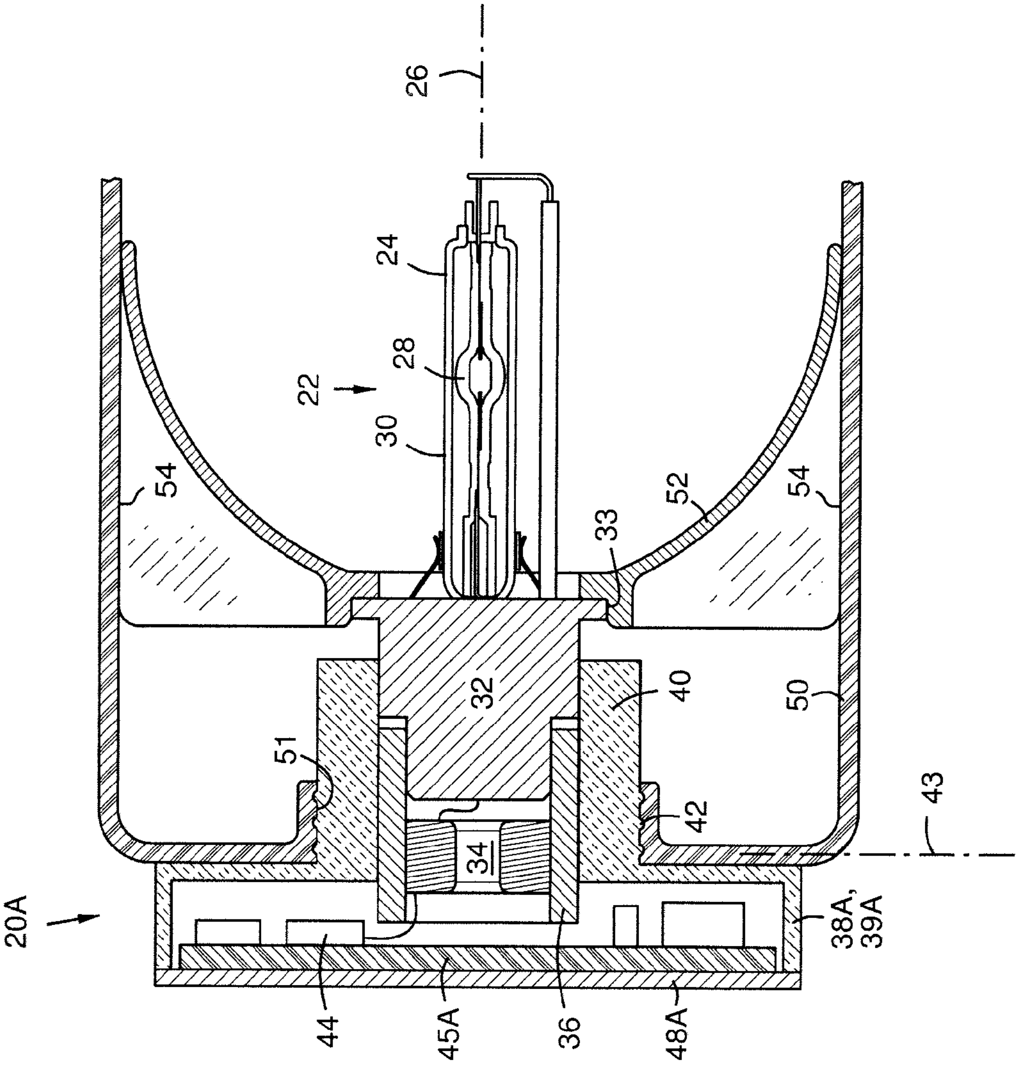
FIG. 1 is a sectional view of an HID lamp unit in an automotive headlamp enclosure according to an embodiment A of the invention.

FIG. 1 shows a lamp unit 20A in a lamp enclosure 50 with a back side access opening 51. A high intensity discharge lamp bulb 22 has a front end 24, a discharge tube 28, a transparent shroud 30, and a longitudinal axis 26, as known in the art. The back end of the bulb 22 is mounted in a bulb holder 32. An electronics housing 38A has a thermally insulated portion 40 mounted on the bulb holder, and a closure portion 42 that seals the access opening 51, providing a first fixation area of the housing 38A and bulb 22 to the enclosure 50. The closure portion 42 may include threads or other known fastening mechanisms generally in a plane 43. A reflector 52 may be mounted 54 in the lamp enclosure 50 to reflect light from the bulb 22 forward. The reflector may be arranged to contact the bulb holder 32 and thus provide a second fixation area 33 of the housing and bulb to the enclosure. This results in a two-point fixation system for the electronics housing 38A and bulb 22 that reduces their vibration in automotive applications. Lamp ignition electronics 34 are mounted in the thermally insulated portion 40 of the electronics housing. A carrier 36 may be provided for this purpose. Lamp ballast electronics 44 are mounted in a back portion 39A of the electronics housing behind the closure portion 42. This arrangement insulates the ignition electronics 34 and the ballast 44 from heat inside the lamp enclosure 50, provides external cooling for the electronics 34, 44, and allows the electronics housing 38A to serve as a closure for the access opening 51.

Figure 2:
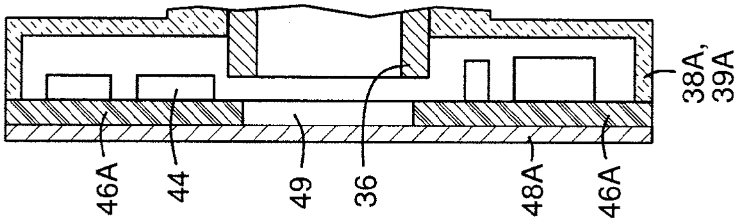
FIG. 2 is a partial sectional view of a back portion of the electronics housing of FIG. 1, showing some alternatives of embodiment A.
Figure 3:
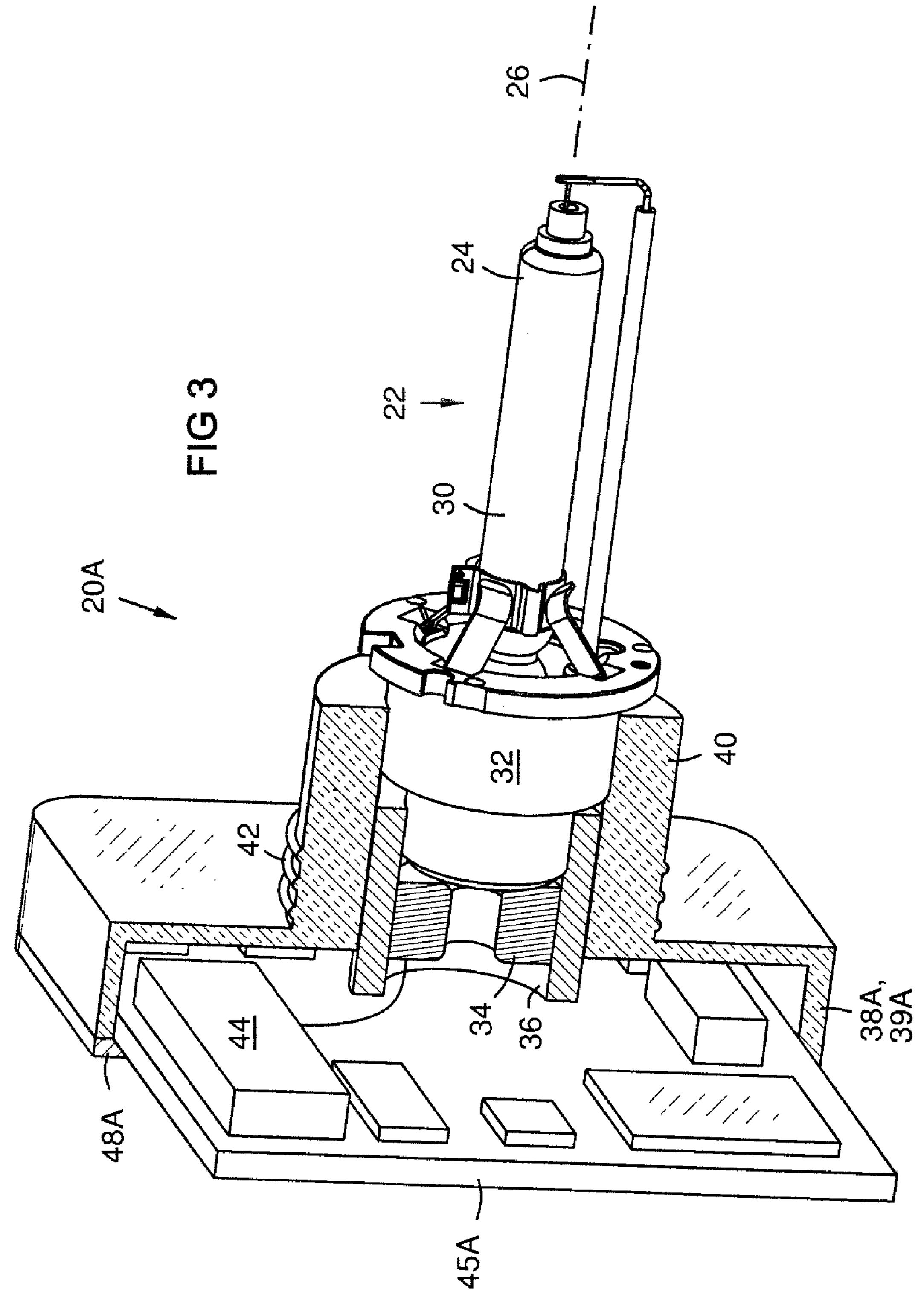
FIG. 3 is a perspective cut-away view of embodiment A of FIG. 1.

A thermally conductive element 48A may be thermally connected to the ballast electronics 44, and exposed to air outside of the lamp enclosure 50. For example, the ballast 44 may be mounted on a circuit board 45A which may be mounted on a thermally conductive back plate 48A. In one example embodiment, the circuit board may be attached to the thermally conductive back plate using an adhesive, such as a thermally conductive adhesive or tape. In another example embodiment, a circuit board 46A may have an exposed thermally conductive backside layer 48A as in FIG. 2. Optionally, the circuit board 46A may have a central hole 49 or other gaps that allow direct thermal conduction between air inside the back portion 39A of the electronics housing 38A and the conductive element 48A as shown in FIG. 2. Optionally, cooling fins may extend backward from the thermally conductive element as later described. FIG. 3 shows a partial cutaway perspective view of embodiment 20A of the lamp unit.

Figure 4:
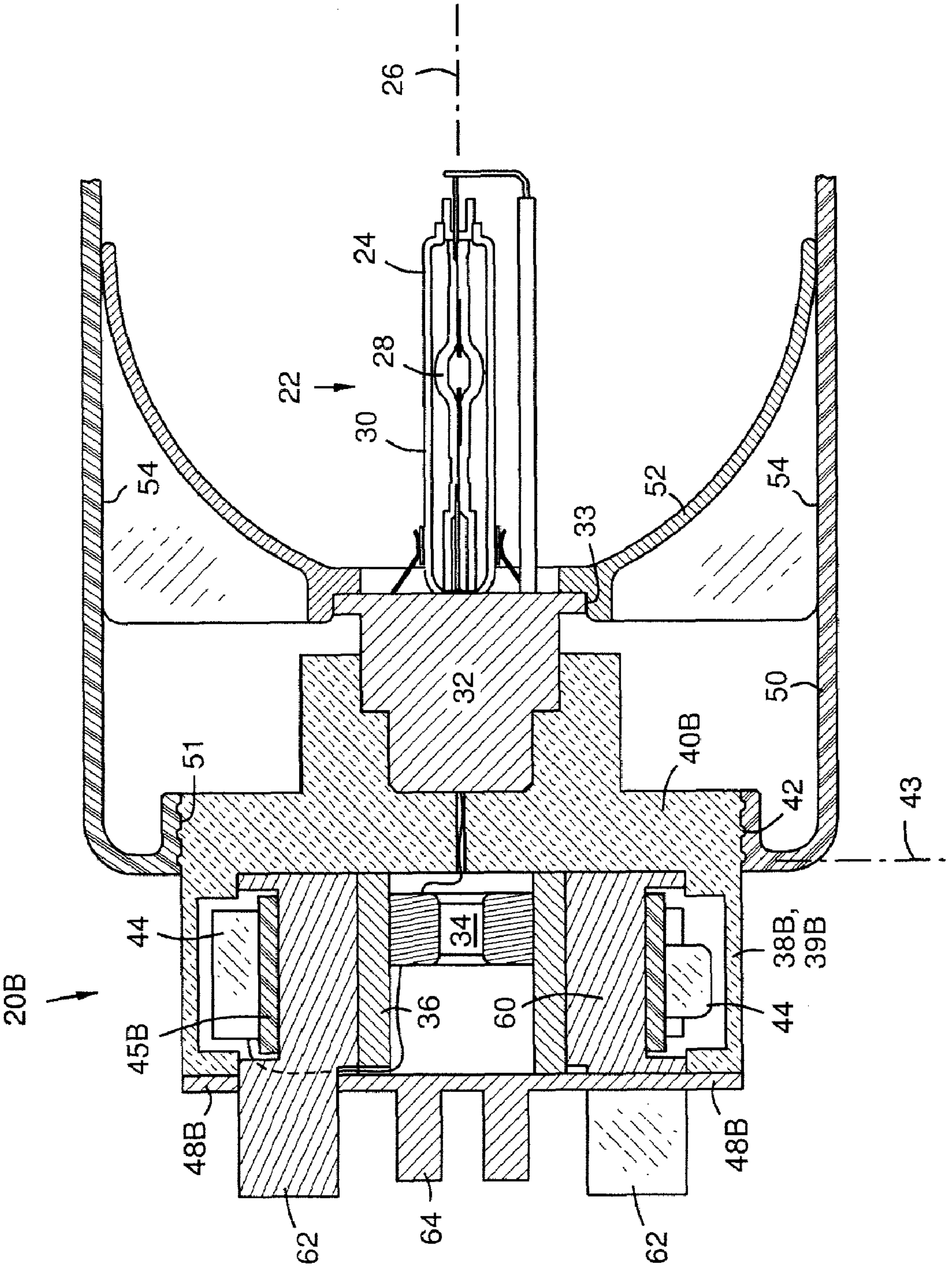
FIG. 4 is a sectional view of an embodiment B of the invention.
Figure 5:
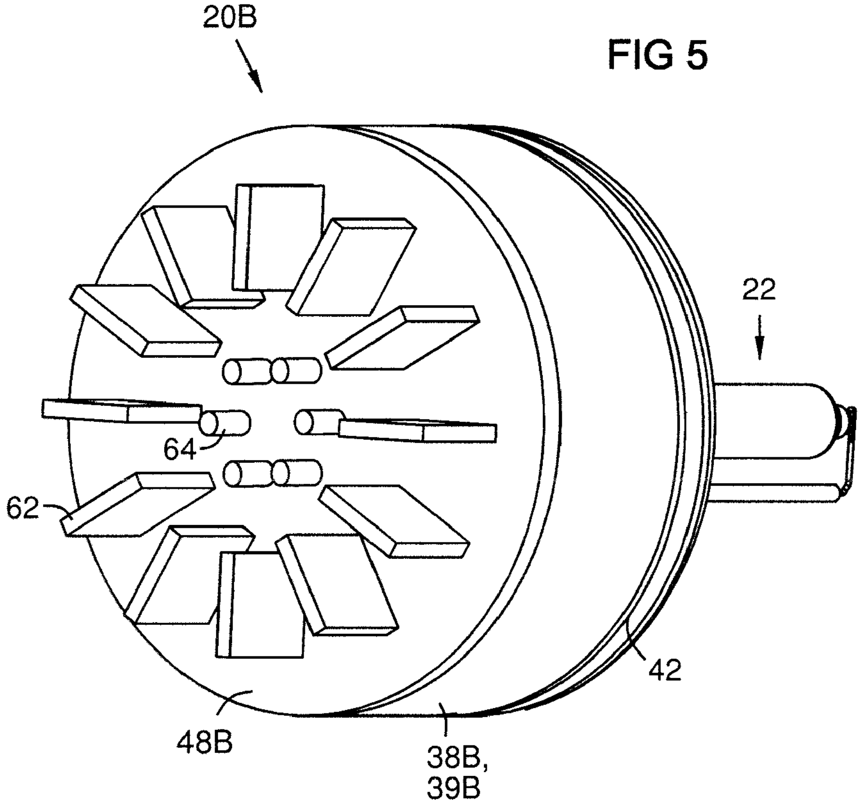
FIG. 5 is a back perspective view of embodiment B.

FIG. 4 shows a second embodiment 20B of the lamp unit. The electronics housing 38B has a cylindrical back portion 39B in which the ignition electronics carrier 36 may be mounted centrally within a mandrel 60. The ballast circuit board 45B may be a flexible type that is wrapped around the mandrel 60, forming a cylindrical arc. The mandrel 60 may be thermally conductive, and may have fins 62 that extend backward externally for cooling the electronics 34, 44. A back cover 48B may be provided to seal the electronics 34, 44 from intrusion of foreign substances, such as airborne particulates, water, etc. The back cover 48B may be thermally conductive, and may have fins 64 for cooling the ignition electronics. The fins 62 may be part of the mandrel 60, and may extend through openings in the back cover 48B, or the fins 62 may be part of the back cover 48B. The thermally insulated portion 40B of the electronics housing 38B may form a thermal barrier along the closure plane 43 as shown, to thermally isolate the lamp electronics 34, 44, from the interior heat of the lamp enclosure 50. FIG. 5 shows a back view of embodiment 20B, illustrating fins 62, 64 extending backward through or from a back cover 48B.

Figure 6:
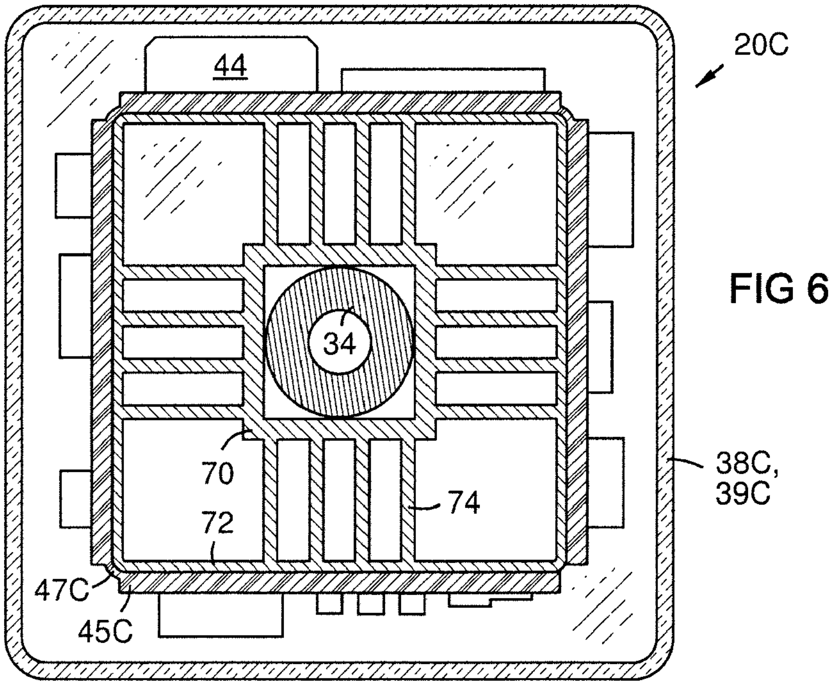
FIG. 6 is a back sectional view of an embodiment C of the invention.

FIG. 6 shows a back sectional view of a third embodiment 20C of the lamp unit taken through a back portion 39C of an electronics housing 38C. The ignition electronics 34 may be mounted on a thermally conductive radially inner frame 70, the ballast electronics 44 may be mounted on a rigid/flex circuit board 45C that is mounted peripherally around a thermally conductive radially outer frame 72. In one example embodiment, the board may be attached to the frame using thermally conductive adhesive or tape. The inner and outer frames 70, 72 are connected by thermally conducive spans 74. The term "radial" is used herein relative to a longitudinal axis 26 of the lamp bulb. Thus "radially inner" means closer to the axis 26 than "radially outer". A rigid/flex circuit board 45C has flat segments connected by flexible hinges 47C as known in the art. Flexible electrical conductors span between the segments. Alternately, up to four separate circuit boards may be mounted, and interconnected by wires. It will be appreciated that usage of an adhesive tape to mount the rigid parts of the circuits boards may be desirable since this reduces the effect of vibration loading, e.g., by damping out vibrations.

Figure 7:
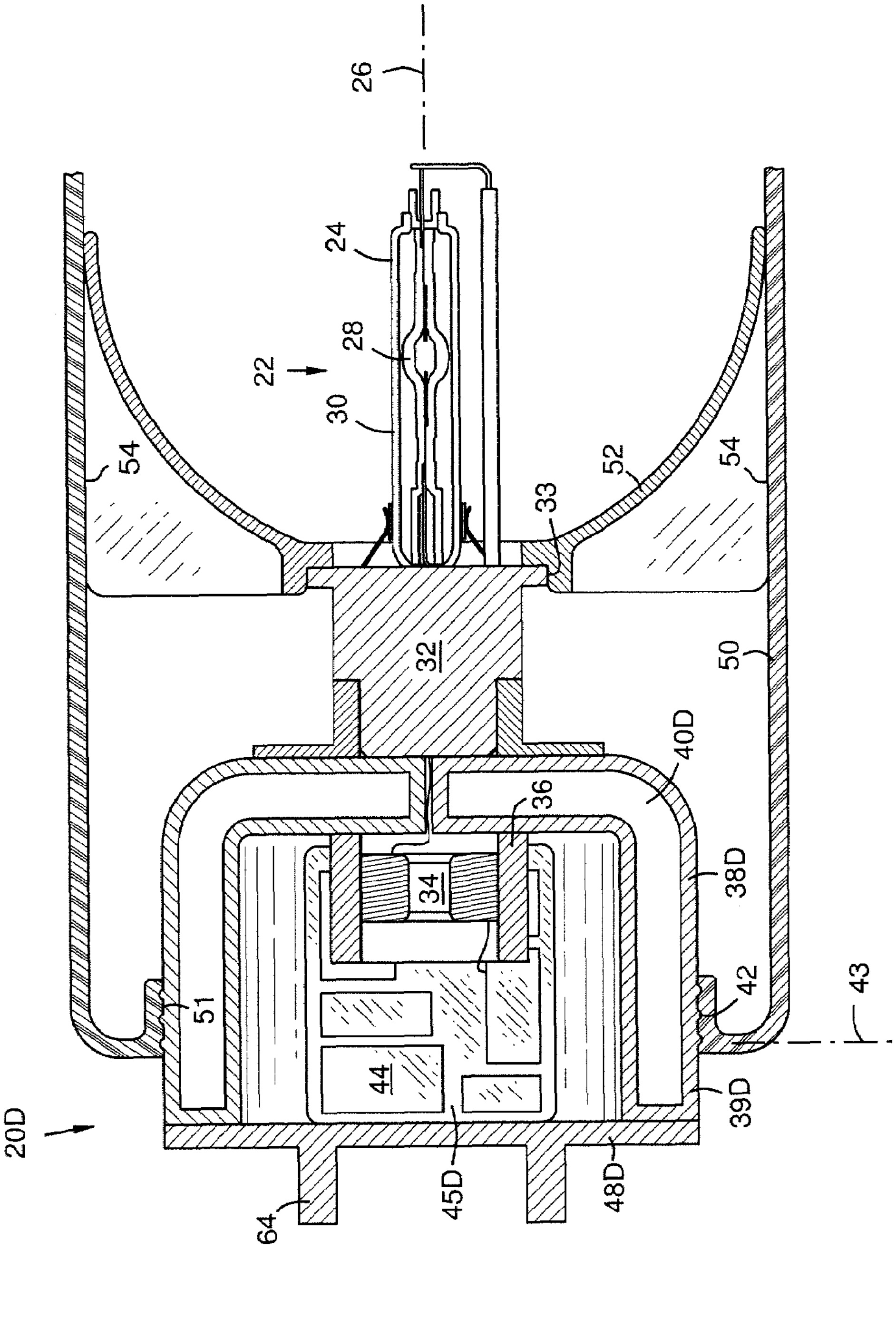
FIG. 7 is a sectional view of an embodiment D of the invention.

FIG. 7 shows a fourth embodiment 20D of the lamp unit. The electronics housing 38D may be cylindrical, and the ignition electronics carrier 36 may be mounted centrally within it, directly behind the lamp holder 32. One or more circuit boards 45D may be mounted beside the carrier 36 as shown. Ballast electronics 44 may be mounted on the radially inner surface of the circuit board 45D as shown, or on the outer surface, away from the carrier. A back cover 48D on the back 39D of the electronics housing 38D seals the electronics 34, 44 from entry of foreign substances, such as airborne particulates, water, etc. It may be thermally conductive, and may have fins 64 for cooling the electronics 34, 44. A thermally insulated portion 40D of the electronics housing 38D may be an evacuated double wall. Such vacuum wall insulation may optionally be used in the other embodiments 20A, 20B, and 20C. This thermally insulates the lamp electronics 34, 44, from the interior heat of the lamp enclosure 50.

The back cover 48A, 48B, 48D may be made in sections that allow access to selected electronics. For example a central circular section may be separately removable to service the ignition electronics 34 only.

In operation, thermally-conductive structure (e.g., 48A, 48B, 48D, 60, 62, 64, 70, 72, 74) as may be thermally coupled to a back portion (e.g., 39A, 39B, 39C, 39D) of the electronics housing may provide heat transfer from the lamp enclosure to a surrounding environment to cool the electronics. The heat transfer modality may be convective, conductive, or via thermal radiation. This allows the electronics to be sealed in the housing for protection against entry of foreign substances without overheating.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A high-intensity discharge lamp, comprising:

a high-intensity discharge bulb comprising a holder;

a electronics housing for ballast and ignition electronics, the electronics housing attached to the holder, forming an integral bulb and electronics unit;

the electronics housing comprising a removable closure for an access opening in a lamp enclosure;

the electronics housing thermally isolating the ballast and ignition electronics from heat inside the lamp enclosure;

a heat sink and radiator on a back portion of the electronics housing configured to provide heat transfer from the lamp enclosure to a surrounding environment to cool the electronics; and the electronics housing fixed to the access opening of the lamp enclosure, and also fixed at a second area in the lamp enclosure, thus providing a stable two-point fixation for the integral bulb and electronics unit.

2. The high intensity discharge lamp of claim 1, wherein the heat sink and radiator comprises a metal back plate on the electronics housing.

3. The high intensity discharge lamp of claim 1, wherein the heat sink and radiator comprises a thermally conductive layer on a back side of a ballast circuit board mounted in the back portion of the electronics housing.

4. The high intensity discharge lamp of claim 1, wherein the heat sink and radiator comprises thermally conductive fins mounted in and extending backward from the electronics housing.

5. The high intensity discharge lamp of claim 1, wherein at least part of the thermally insulated portion of the electronics housing comprises a sealed evacuated space between outer and inner walls.

6. The high intensity discharge lamp of claim 1, wherein the ignition electronics are mounted in a carrier behind the lamp bulb holder in the electronics housing.

7. The high intensity discharge lamp of claim 6, wherein the closure is located approximately in a plane normal to the longitudinal axis of the lamp bulb at a front end of the carrier, thus locating the carrier outside the lamp enclosure.

8. The high intensity discharge lamp of claim 7, wherein the electronics housing comprises thermal insulation along the plane of the closure, and the ignition electronics and the ballast electronics are mounted behind the plane of the closure, thermally isolating the electronics from an interior space of the lamp enclosure.

9. The high intensity discharge lamp of claim 8, wherein the ignition electronics are mounted centrally behind the bulb holder and behind the plane of the closure, and the ballast electronics are mounted on a circuit board radially surrounding and spaced from the ignition electronics carrier.

10. The high intensity discharge lamp of claim 9, wherein the back portion of the electronics housing comprises a cylindrical wall generally coaxial with the lamp longitudinal axis, the ballast circuit board is flexible and is bent into a cylindrical arc about a thermally conductive mandrel between the carrier and the cylindrical wall, and wherein thermally conductive fins extend backward from the mandrel for air cooling of the electronics.

11. The high intensity discharge lamp of claim 9, wherein the ignition electronics are mounted in a thermally conductive radially inner frame, the ballast electronics are mounted on a circuit board that is mounted peripherally around a thermally conductive radially outer frame, and the inner and outer frames are connected by thermally conducive spans.

12. A high intensity discharge lamp with integral electronics, comprising:

a lamp enclosure comprising a back side with an access opening;

a high intensity discharge lamp bulb comprising front and back ends and a longitudinal axis;

the back end of the bulb mounted in a bulb holder;

an electronics housing comprising a thermally insulated portion mounted on the bulb holder, and a closure that seals the access opening and provides a fixation of the housing to the enclosure;

a fixation of the bulb holder to a reflector in the lamp enclosure;

lamp ignition electronics mounted in the thermally insulated portion of the electronics housing; and lamp ballast electronics mounted in a back portion of the electronics housing.

13. The high intensity discharge lamp of claim 12, further comprising a thermally conductive element thermally connected to the ballast electronics and exposed to air outside of the lamp enclosure.

14. The high intensity discharge lamp of claim 13, wherein the thermally conductive element comprises thermally conductive fins mounted on and extending backward from the electronics housing.

15. The high intensity discharge lamp of claim 13, wherein at least part of the thermally insulated portion of the electronics housing comprises a sealed evacuated space between outer and inner walls.

16. The high intensity discharge lamp of claim 13, wherein the electronics housing comprises thermal insulation along a plane of the closure, and the ignition electronics and the ballast electronics are mounted behind the plane of the closure, thermally isolating the electronics from an interior space of the lamp enclosure.

17. The high intensity discharge lamp of claim 13, wherein the ignition electronics are mounted centrally behind the bulb holder and behind a plane of the closure, and the ballast electronics are mounted on a circuit board radially surrounding and spaced from the ignition electronics.

18. The high intensity discharge lamp of claim 13, wherein the back portion of the electronics housing comprises a cylindrical wall generally coaxial with the lamp longitudinal axis, the ballast circuit board is flexible and is bent into a cylindrical arc about a thermally conductive mandrel between the ignition electronics and the cylindrical wall, and wherein thermally conductive fins extend backward from the mandrel for air-cooling of the electronics.

19. The high intensity discharge lamp of claim 13, wherein the ignition electronics are mounted in a thermally conductive radially inner frame, the ballast electronics are mounted on a rigid/flex circuit board that is mounted peripherally around a thermally conductive radially outer frame, and the inner and outer frames are connected by thermally conducive spans.

* * * * *